(12) United States Patent
Yeghiayan et al.

(10) Patent No.: US 7,426,974 B1
(45) Date of Patent: Sep. 23, 2008

(54) AIR BEARING BASE AND WORKSTATION

(76) Inventors: Arra D. Yeghiayan, 16 Washington Rd., Windham, NH (US) 03087; Raffi P. Yeghiayan, 188 Spring St., Lexington, MA (US) 02421

( * ) Notice: Subject to any disclaimer, the term of this patent is extended or adjusted under 35 U.S.C. 154(b) by 0 days.

(21) Appl. No.: 10/821,222

(22) Filed: Apr. 8, 2004

Related U.S. Application Data (60) Provisional application No. 60/461,359, filed on Apr. 9, 2003.

(51) Int. Cl.
  *B60V 1/11* (2006.01)
(52) U.S. Cl. .................. 180/125; 180/124; 180/127; 180/128; 414/676
(58) Field of Classification Search ............ 180/124, 180/125, 127, 128; 414/676
  See application file for complete search history.

(56) References Cited

U.S. PATENT DOCUMENTS

| | | | |
|---|---|---|---|
| 3,313,367 A | | 4/1967 | Swedburg |
| 3,513,934 A | | 5/1970 | Crowley |
| 3,756,342 A | * | 9/1973 | Burdick ................ 180/124 |
| 3,780,823 A | * | 12/1973 | Michaud et al. ........... 180/124 |
| 3,796,279 A | * | 3/1974 | Burdick et al. ............ 180/124 |
| 4,240,773 A | | 12/1980 | Terry |
| 4,441,571 A | * | 4/1984 | Wood .................. 180/128 |
| 4,815,926 A | * | 3/1989 | Chaffee et al. ............ 414/676 |
| 5,087,280 A | * | 2/1992 | Fuchigami .............. 180/124 |

* cited by examiner

*Primary Examiner*—Lesley D. Morris
*Assistant Examiner*—Matthew Luby
(74) *Attorney, Agent, or Firm*—Hayes Soloway PC (57) ABSTRACT

In accordance with the present invention, there is provided a workstation or other heavy object which is easily moved, yet steady and stable when parked. Underneath this object is attached a multiple air-bearing device having a backplate, a membrane which is selectively bonded to the backplate, and a stencil and dimple which further prevent separation of the membrane from the backplate and which also provide a bearing surface for the workstation to rest with stability against the floor. Pressurized air is introduced through the base and behind the unbonded portions of the membrane, inflating the membrane and creating lift, and additionally forming a pneumatic seal against the floor. Air passages through the membrane and within the sealed footprint allow air to flow into and through the region between the membrane and the floor, creating an air-lubricated bearing that allows nearly frictionless motion of the heavy object.

10 Claims, 10 Drawing Sheets

AIR BEARING BASE AND WORKSTATION

RELATED PATENT APPLICATION

This application claims priority in accordance with 37 C.F.R. §1.78 to Provisional Patent Application Ser. No. 60/461,359, filed Apr. 9, 2003, for which the priority date is claimed.

FIELD OF THE INVENTION

The present invention relates to air bearing bases for workstations and, more particularly, to workbenches and mobile work surfaces, cabinets, and equipment such as large power tools, that must be moved, yet must also be steady and stable when parked.

BACKGROUND OF THE INVENTION

Workstations, such as workbenches, base cabinets with countertops, and equipment such as large power tools, are used to support materials and projects while operations are performed on them. To do this job well, workstations are typically built with strength and rigidity, and either weighted or attached to a wall or floor so that they may adequately withstand the loads applied to them or the toppling forces generated within them. For example, a board may be clamped to a workbench and cut with a saw. During this operation it is desirable for the workbench to hold the board with little or no motion.

It is often necessary to move a workstation. Reasons include sharing the use of the floor space occupied by the workstation for other purposes, the need to re-arrange a work area or flexible manufacturing cell, and the need to move projects and tools around a work area or production floor while the projects and tools are on the workstation itself.

These two needs of stability and portability are at odds with one another. The user of a workbench, for example, is faced with a decision: either choose a bench which is heavy or attached and therefore serves well as a work platform, or choose a bench that is lightweight and freestanding to provide moveability.

To make it possible to move a heavy workstation, wheels having casters may be added to the base. To prevent undesired motion, the casters are sometimes equipped with a locking mechanism to inhibit or prevent both swivel and wheel rotation. Alternately, casters may be mounted on a mechanism that allows them to be raised and lowered as needed.

Current, commercially available air bearings are used to move heavy equipment, but are generally complicated and therefore impractically expensive to dedicate to one item.

In U.S. Pat. No. 4,240,773 issued to Terry, an apparatus is described for the purpose of transporting heavy loads on commercially available air bearings. The apparatus is built for the single specific task of moving paper rolls, and the load must be relatively well centered.

U.S. Pat. No. 3,513,934 issued to Crowley shows a general-purpose base for lifting and transporting. This device uses a membrane with apertures that are cut and registered to the base. The floor seal is accomplished by means of a free-edged skirt with perforations.

In U.S. Pat. No. 3,313,367, issued to Swedburg, a single bearing is shown with a resonating chamber.

Raise/lower arrangements are not common since they are typically expensive and/or awkward. In addition, there are other disadvantages to wheels:

1) Wheeled bases do not permit a work surface to be solid and stable. Even casters that lock both swivel and wheel rotation never allow a workbench, cabinet, or machine tool to sit absolutely solidly. A work surface that jiggles even slightly is frustrating, unprofessional, and potentially unsafe to work on.

2) Wheels do not roll easily across the typical workshop or production floor. Caster wheels bearing heavy loads are difficult to push across a shop floor. Rolling resistance for a fully loaded cabinet is often so high that multiple physically strong people are needed to move loaded cabinets. Minor floor irregularities can become obstacles.

3) Wheels and casters, in particular, make it difficult to precisely position or steer heavy objects. Casters must swing before tracking predictably, and small motions or alignments are difficult. When a wheeled bench or cabinet is moved against a wall, adjacent benchtop, or other object, it often rolls back slightly, from hysteresis, and leaves an undesirable gap.

4) Wheels and associated hardware create a space under which debris may collect.

5) Wheels significantly raise the height of the object.

6) Wheels and associated hardware can create a trip hazard. If the wheels are moved further inboard under the object to eliminate or reduce protrusion, the footprint is reduced and stability is sacrificed, creating a tipping or rollover hazard.

7) Rolling wheels can create pinch hazards for toes.

8) Wheels concentrate supported loads over a small area. The resulting high contact pressure can damage the floor surface or objects over which the wheels roll.

It is therefore an object of the invention to provide an easy means of moving heavy loads, yet to allow the loads to be steady and stable when parked.

It is another object of the invention to provide a versatile base that may be placed under any object to be moved across a relatively smooth surface.

It is another object of the invention to provide a heavy, solid workbench that may be easily moved, yet is steady and stable when parked.

It is another object of the invention to provide a multiple air bearing assembly that is self-balancing and can tolerate substantially off-balance loads without adjustment.

It is another object of the invention to provide an air bearing that, when unpressurized, retracts fully so that it is not damaged by dragging across the floor under load.

It is another object of the invention to provide a multiple-bearing base that supports the load redundantly, so that if air pressure is lost in one bearing (for example, when traversing a gap in the floor), another bearing or bearings will automatically compensate for the lost lift and continue to carry the load.

It is another object of the invention to provide an easily manufactured, simple, low-cost, readily-customized multiple-bearing assembly.

It is another object of the invention to provide means by which objects may be precisely maneuvered and positioned with free omnidirectional motion.

It is another object of the invention to protect floors from damage by distributing the load over a large area both while flying and when parked.

It is another object of the invention to provide means to lock a moved object into the precise desired position without further motion.

It is another object of the invention to provide means for creating the widest possible footprint under an object for maximum stability and resistance to tipping loads.

It is another object of the invention to provide a continuous closed base which does not allow the accumulation of debris, and therefore reduces cleaning efforts.

It is another object of the invention to provide a base with no protruding objects which create potential trip hazards or obstacles to cleaning equipment such as brooms.

It is another object of the invention to provide a method by which a person of nearly any strength and without special training, equipment, or assistance, can easily and safely move loads.

It is another object of the invention to provide a method of moving objects without danger of injuring toes or objects by rolling over them.

SUMMARY OF THE INVENTION

In accordance with the present invention, there is provided a workstation or other heavy object which is easily moved, yet steady and stable when parked. Underneath this object is attached a multiple air-bearing device, which has a backplate, a membrane which is selectively secured to the backplate, and a stencil and dimple which further prevent separation of the membrane from the backplate. The stencil and dimple also provide a bearing surface for the workstation when at rest against the floor. Pressurized air is introduced through the base and behind the unsecured portions of the membrane, inflating the membrane and creating lift, and additionally forming a pneumatic seal against the floor. One or more passages through the membrane and within the sealed footprint allow air to flow into and through the region between the membrane and the floor, creating an air-lubricated bearing that allows nearly frictionless motion of the workstation or heavy object.

For purposes of brevity, the word "air" shall collectively refer to any fluid (water, oil, gas, etc.) that may be used to pressurize and operate these bearings.

The air-levitated workstation of this invention allows a heavy, solid workstation to be easily moved and precisely positioned by lifting it, while fully loaded with tools and materials, on a free-flowing cushion of air that acts as a nearly frictionless bearing. When the air is switched off, the workstation rests on its legs and becomes a stable, safe, and secure work surface. Use of a single flow control and the air distribution manifolding technique in the current invention makes it possible to run multiple bearings (for load stability and floor gap tolerance) without hop or squeal.

The pressurized air may be provided by several means:

a) via off-board pressurized air source, connected to the workstation via hose;

b) via on-board pressurized air source, which is powered by an external power supply through a power cord, or powered from an onboard electric source such as batteries, allowing for untethered use; or c) via on-board pressurized air source such as high pressure air tanks, which would be periodically refilled, also allowing for untethered use.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

The invention pertains to an air-levitated workstation 10 or any other heavy item to be moved with ease and precision, and which also benefits from being steady and stable when parked.

Figure 1:
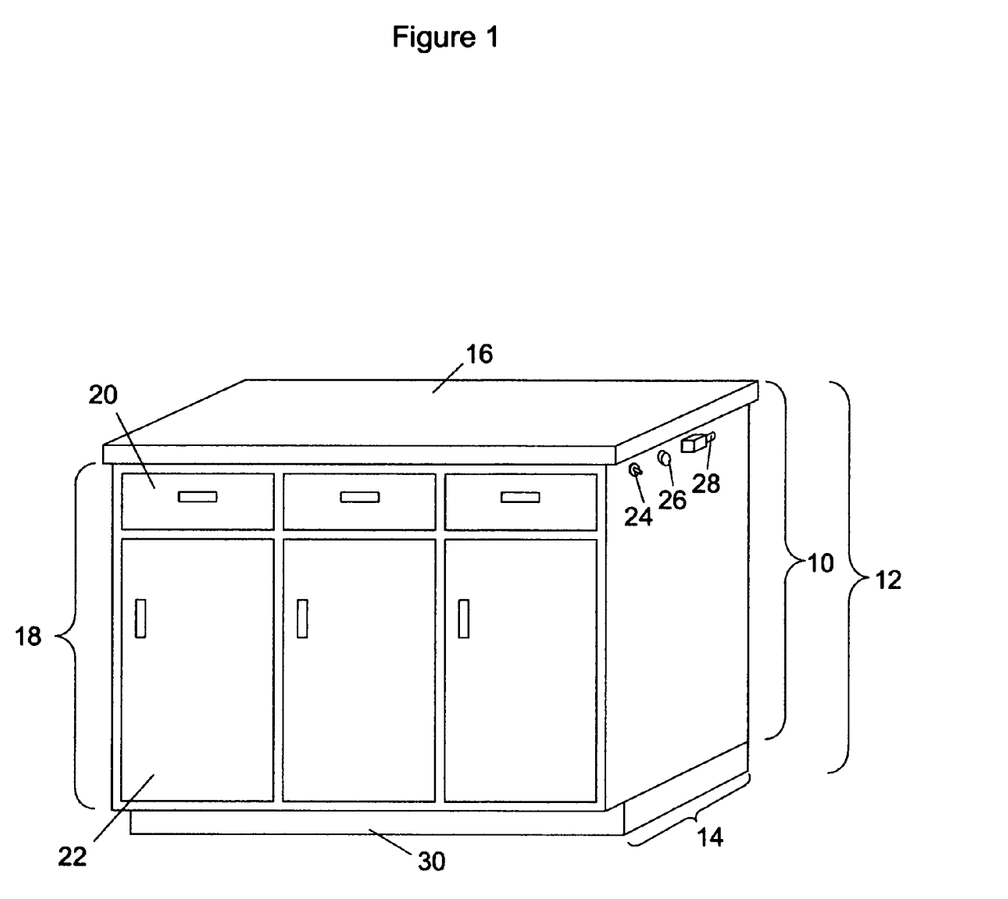
FIG. 1 depicts a complete workstation in accordance with the invention.

FIG. 1 is a perspective view of one possible embodiment of an air-levitated workstation 10. A workbench 12 is mounted on a base 14. The workbench 12 in this embodiment has a butcher block benchtop 16, which is well known and may be made from wood, plastic, metal, or other suitable material. A cabinet 18 is made of metal and has more than one drawer 20 and a door 22. Cabinet 18 can be similarly fabricated from wood or other materials and can be configured with open shelves, sliding trays, etc. In fact, the item 12 mounted on the base 14 can take many forms, including but not limited to laboratory equipment, inventory or tool storage cabinets, food service items such as counters, islands, and bars, heavy equipment such as woodworking and metalworking machinery, or hospital equipment such as gurneys and operating tables, which must be exceptionally stable when parked.

Since the workbench 12 is attached to and sits solidly on its base 14, rather than on wheels, when parked it has no tendency to jiggle or move unexpectedly when loads are applied to it during normal use. When it is desired to move the workstation 10, an electric or pneumatic switch 24 is thrown, and air is allowed to flow from an air inlet 28, through a flow control 26, and to the air bearing cross-section 48 in the base 14. The workstation 10 rises off the floor 60, and is easily moved on a thin lubricating air film 54. The base 14 in this embodiment is covered by a protective dress frame 30.

Figure 2:
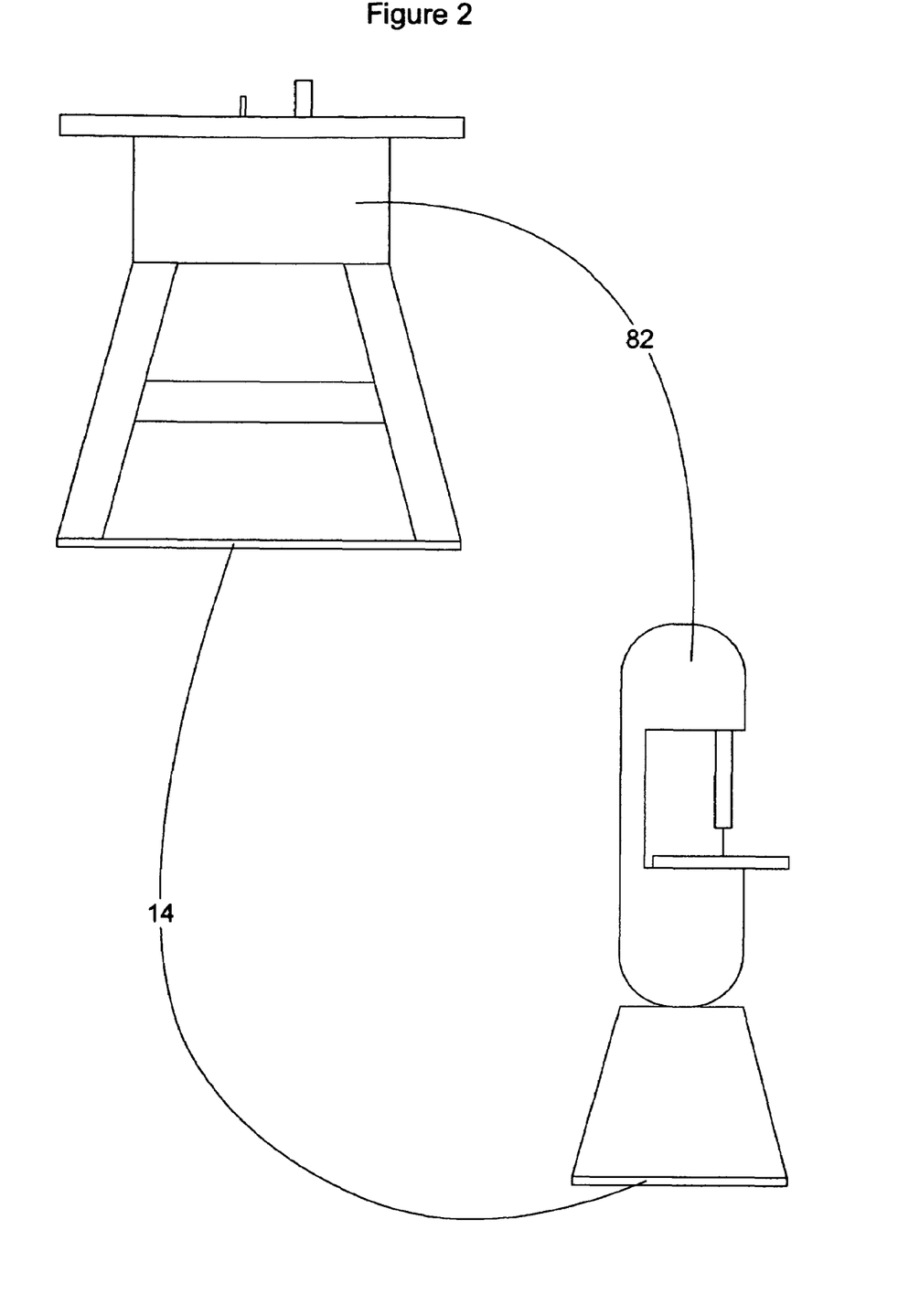
FIG. 2 shows an example of woodworking equipment on the base as shown in FIG. 1.

FIG. 2 is a perspective top view showing an example of another type of workstation 10 and a tool 82 atop base 14. Woodworking equipment and tools, such as a band saw, are some of many items that are difficult to move easily and must also be stable when parked.

Figure 3:
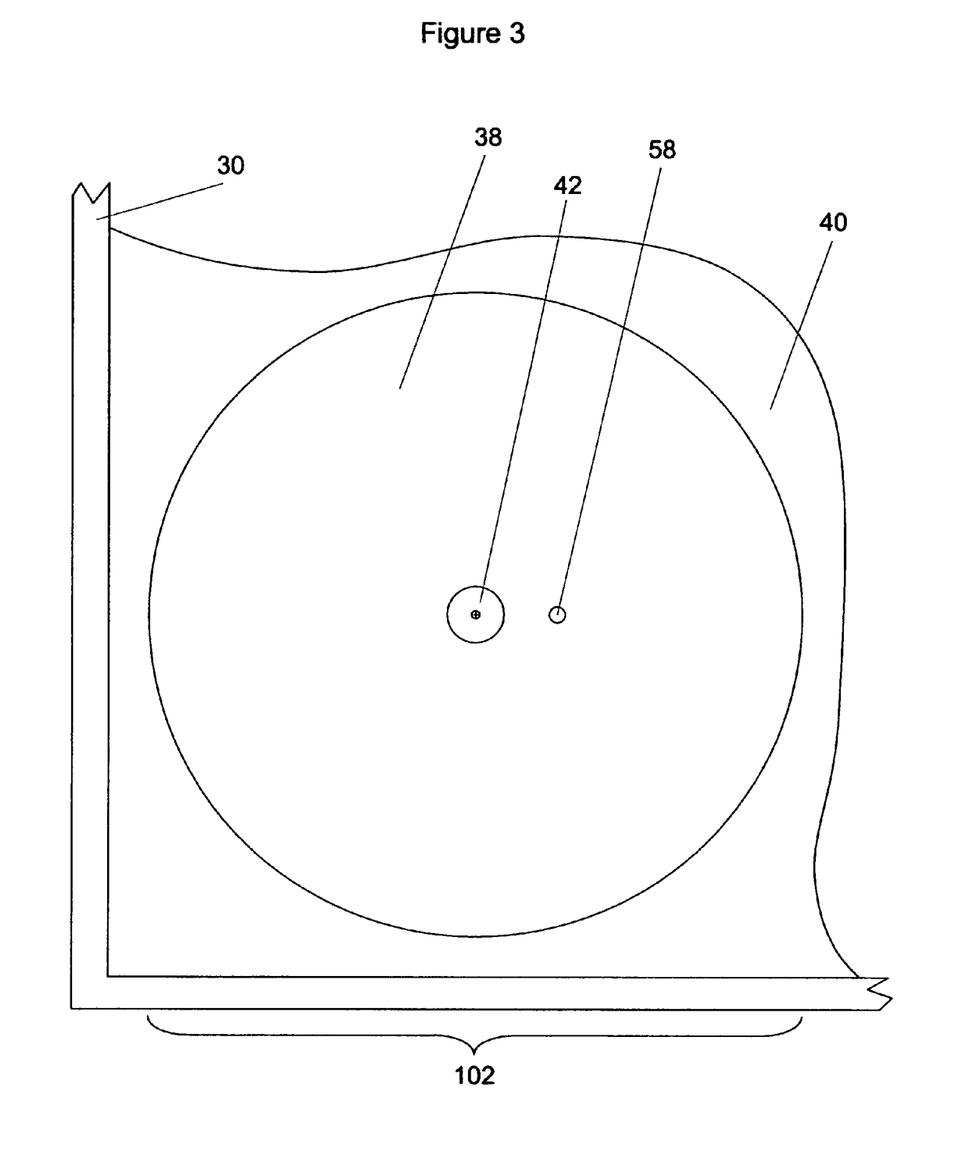
FIG. 3 depicts a single assembled bearing.

FIG. 3 illustrates a single air bearing assembly 102. A dress frame 30 secures the base 14 assembly to the workstation 10, and covers the otherwise visible side of the base 14 assembly. Also shown are the membrane 38, air passage 58, dimple 42, and stencil 40.

Figure 4:
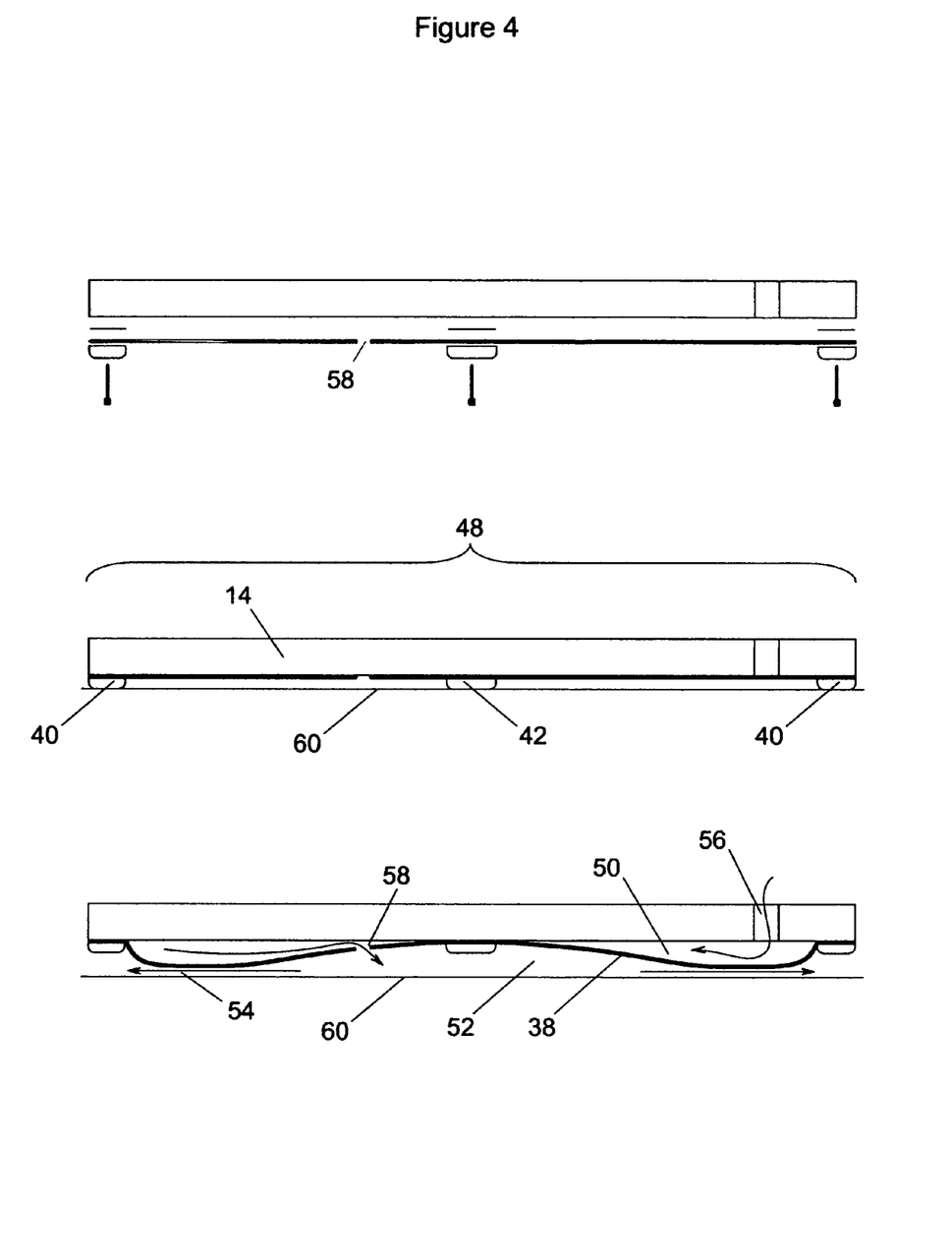
FIG. 4 shows an air bearing before assembly, assembled and inflated.

FIG. 4 is a cross sectional view of a single air bearing 48. The top portion of FIG. 4 shows the bearing layers before assembly. In this example, the unbonded area 36 is not a separate item to prevent bonding particular regions of a continuous adhesive film, but represents areas of adhesive that have been selectively omitted.

The center of the FIG. 4 shows the air bearing 48 assembled and in its quiescent state, not pressurized. In this position the load of the workstation 10 is transferred to the floor 60 by the stencil 40 and, possibly, by the dimple 42, depending on relative thickness and flexibility of the base 14. The bottom portion of FIG. 4 shows the air bearing 48 inflated and flying on a lubricating air film 54.

Air enters through an air inlet port 56 and first inflates the high-pressure side 50, forcing the membrane 38 to contact with floor 60. Air then flows through an air passage 58, which is sized and located such that a pressure differential is maintained between the high-pressure side 50 and the low-pressure side 52. There may be more than one air passage 58 if necessary for uniform air distribution. The pressure differential keeps the membrane 38 in contact with the floor 60 near its outer edge and maintains the seal necessary to create lift and to provide the lubricating air film 54.

Figure 5:
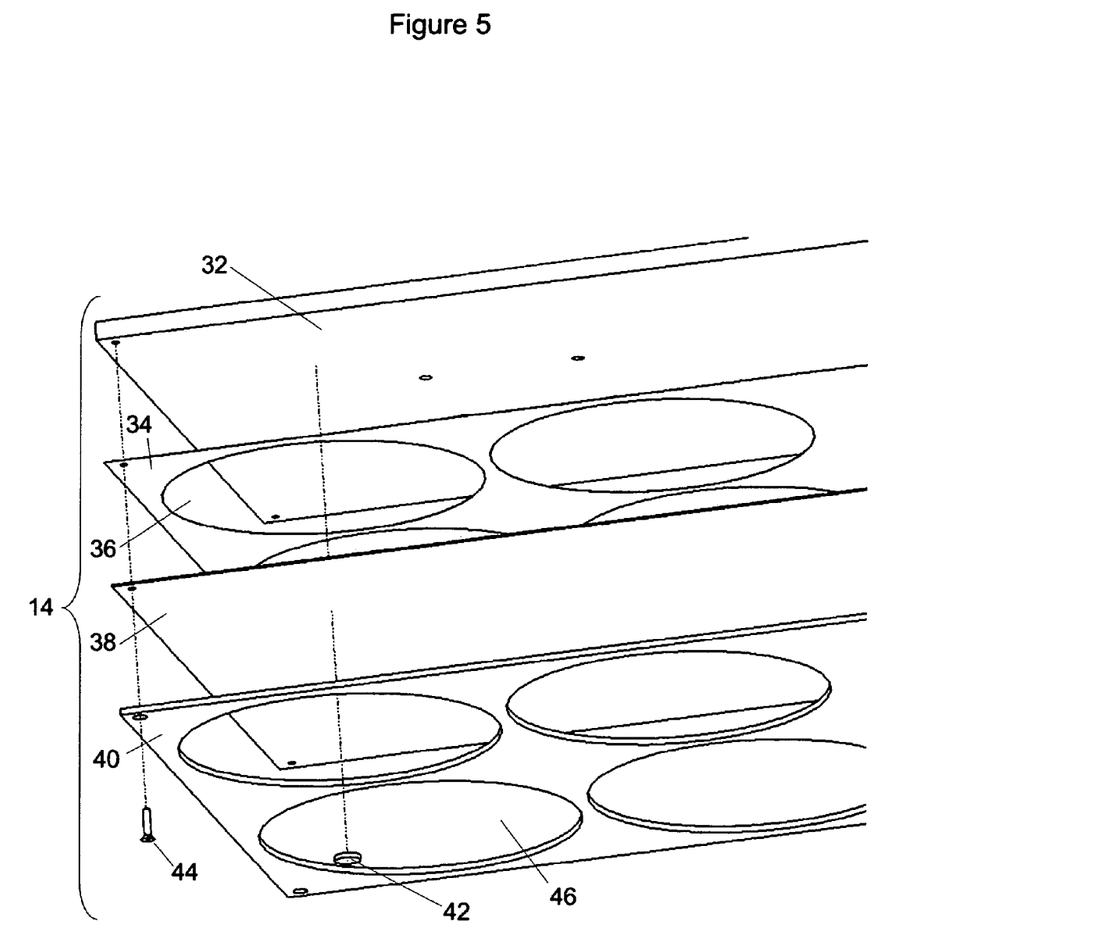
FIG. 5 depicts the base assembly.

FIG. 5 is an exploded, perspective view of a base 14 with more than one air bearing 48. The components allow easy manufacture of a multiple-air-bearing, eccentric-load-tolerant base 14 with standardized components at a significantly lower cost than that of currently available air bearings.

A backplate 32 may be made of any material suitable to bear the distributed load of the workstation 10, and in fact may be the already existing bottom surface of the workstation 10. To this base 14 is applied an airtight bonding layer 34, which may be a double-sided adhesive film or adhesive material that is applied by brush, spray, or other method known in the art.

A portion of the bonding layer 34 is an unbonded area 36, due to removal of the bonding material or by the application of a liner or dust such as talcum to prevent adhesion to a membrane 38. The membrane 38 is made of a flexible material such as ethylene propylene diene monomer (EPDM), or other suitable material. A stencil 40 is applied next, and more than one or more fasteners 44 are used to secure the stencil 40 through the various layers into the base 14.

The stencil 40 has at least one aperture 46, with at least three non-collinear bearings for stability during flight. The aperture 46 is normally round, as this produces the most uniform lubricating air film 54, but other shapes may be used to maximize the lift area. At the center of each unbonded area 36 is disposed a dimple 42, which holds the membrane 38 away from the floor 60 inside the aperture 46.

Figure 6:
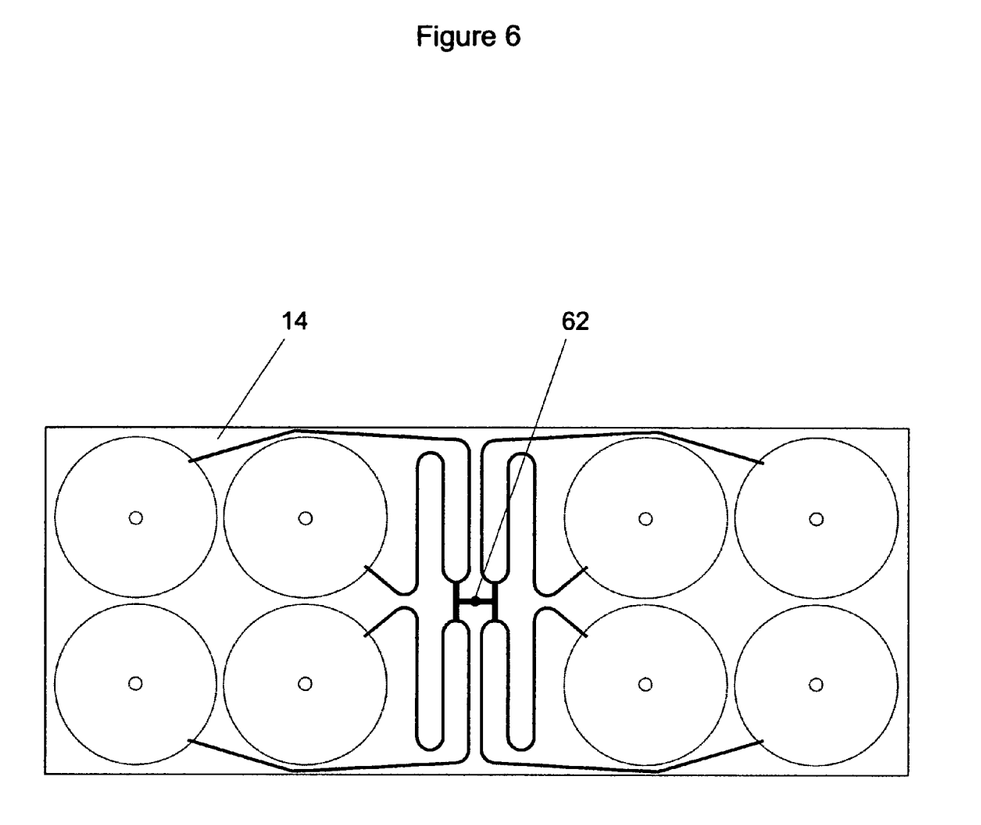
FIG. 6 illustrates redundant bearings for high lift, gap crossing, and improved tolerance to eccentric loads.

FIG. 6 is a bottom view of a multiple-bearing base 14 showing air routing for self-balancing. Each lift region has sufficient and balanced air flow, so that each bearing has independent ability to make a seal with the floor 60 and provide lift and lubrication. An air splitter 62 and balanced flow loss to each bearing accomplish this function by dividing the incoming single air supply equally, with little regard to pressure drop downstream of the splitter, into the required number of air streams. This splitting and distribution may be done by means of tubing and fittings, or by fabrication of a flow-balancing manifold in the form of equal routed channels in the backplate 32.

It is important that the tubing or channels be sized such that back pressure is relatively high. In this way, changes in individual bearing pressures are a small percentage of the overall back pressure on a given distribution line, and the bearings perform independently and without substantial effect from changes in each other. This allows the base 14 to tolerate eccentric loads well. It also allows the base 14 to traverse gaps in floors which both rob a bearing of lift and increase the air consumption of the bearing. The redundant bearing arrangement solves the former problem, and the equal-distribution and relatively high backpressure arrangement of the manifold solves the latter.

Note that the pressurized air may be provided by several means:

a) via off-board pressurized air source, and connected to the workstation 10 via hose;

b) via on-board pressurized air source, which is powered via external power through a power cord or from an onboard electric source such as batteries, not shown, allowing for untethered use; or c) via on-board pressurized air source such as high pressure air tanks, not shown, periodically refilled, also allowing for untethered use.

Figure 7:
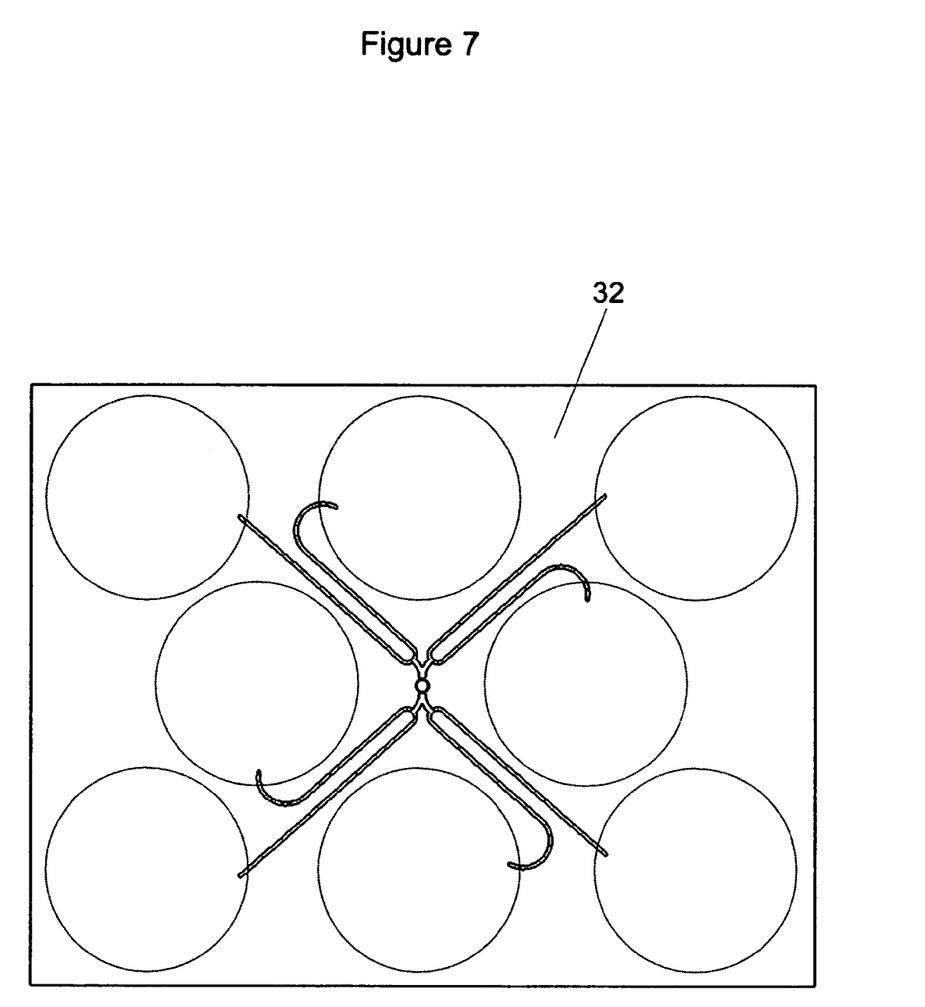
FIG. 7 shows alternate air supply details.

FIG. 7 shows an arrangement of grooved passages formed in the backplate 32. This arrangement supplies an eight-bearing layout which maximizes lift area, maximizes tolerance to eccentric load, maximizes the ability of the base 14 to cross cracks, gaps, or other discontinuities in floors, and provides equally-split and balanced airflow to each air bearing. Note that the amount of backpressure can be varied by changing the width and depth of the grooved passages.

Figure 8:
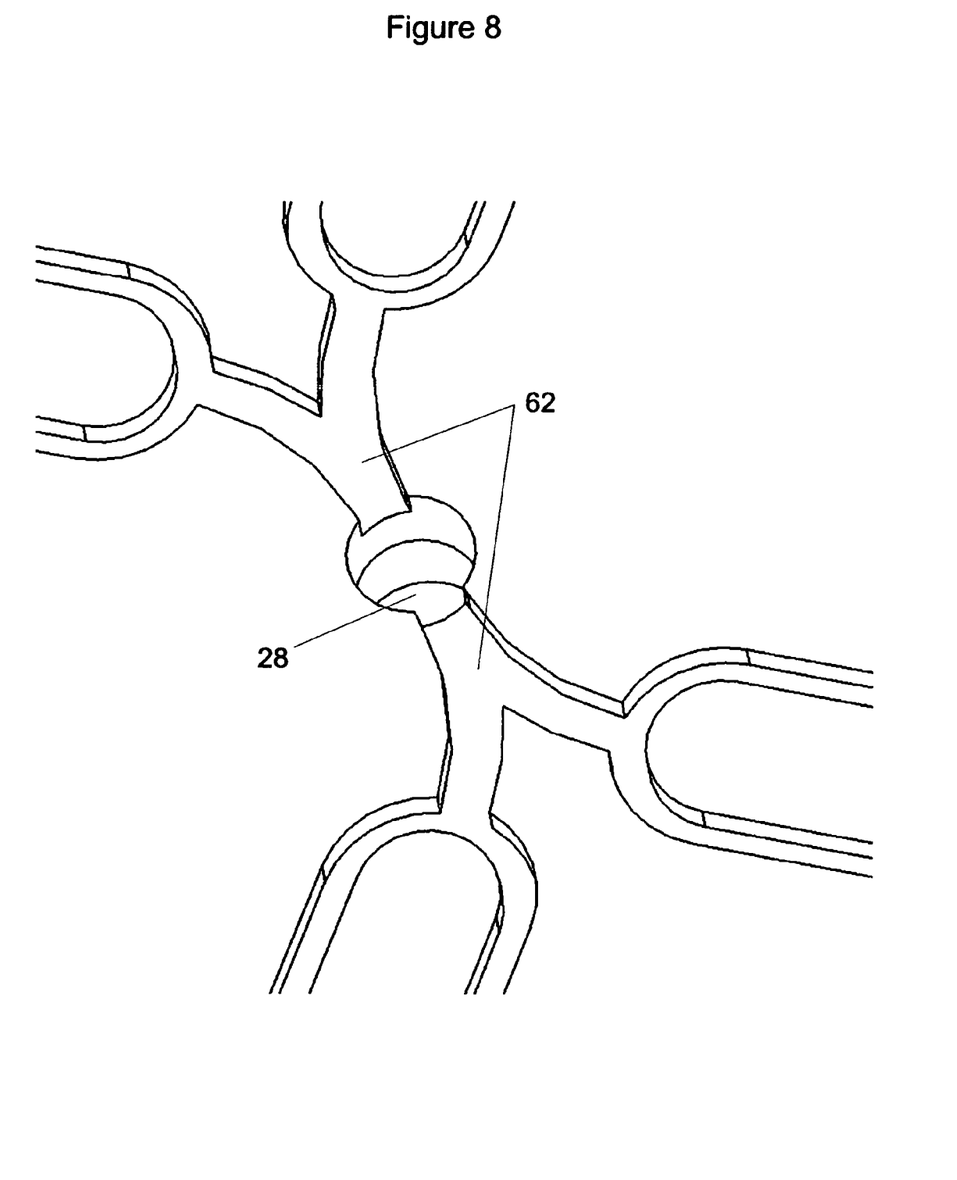
FIG. 8 shows the air splitter close up.

FIG. 8 is a perspective bottom view of the air splitter 62 area of passages from FIG. 7. The single hole through the center is the air inlet 28, and the varying width of the grooves aids in flow distribution. Again, this is effective for the eight-bearing layout shown. Other arrangements based on similar principles will be better suited for differing base 14 outline geometries.

Figure 9:
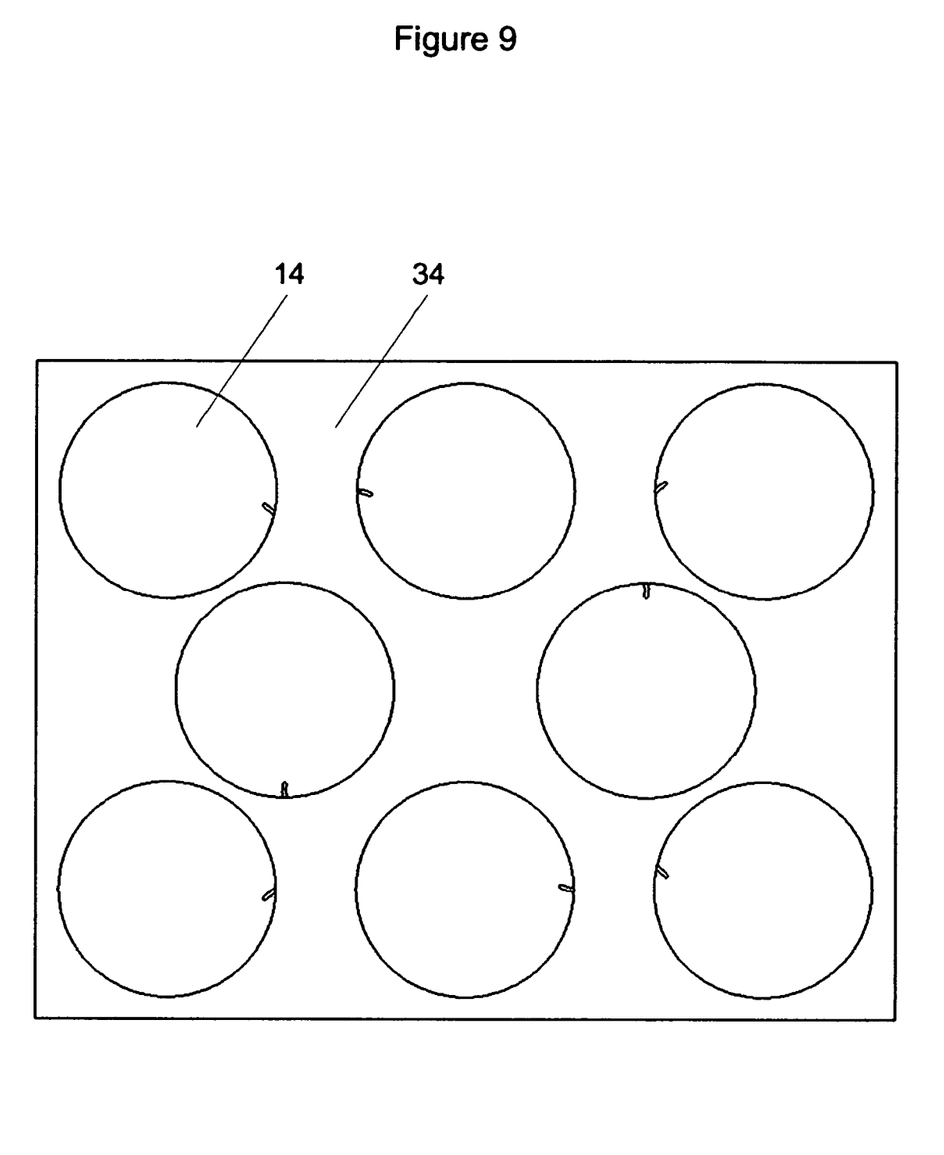
FIG. 9 illustrates an alternate air supply partial assembly.

FIG. 9 shows a partial assembly of the base 14 from FIG. 7, and the bonding layer 34 only. This FIG. 9 illustrates the manner in which air is actually introduced to each bearing.

Figure 10:
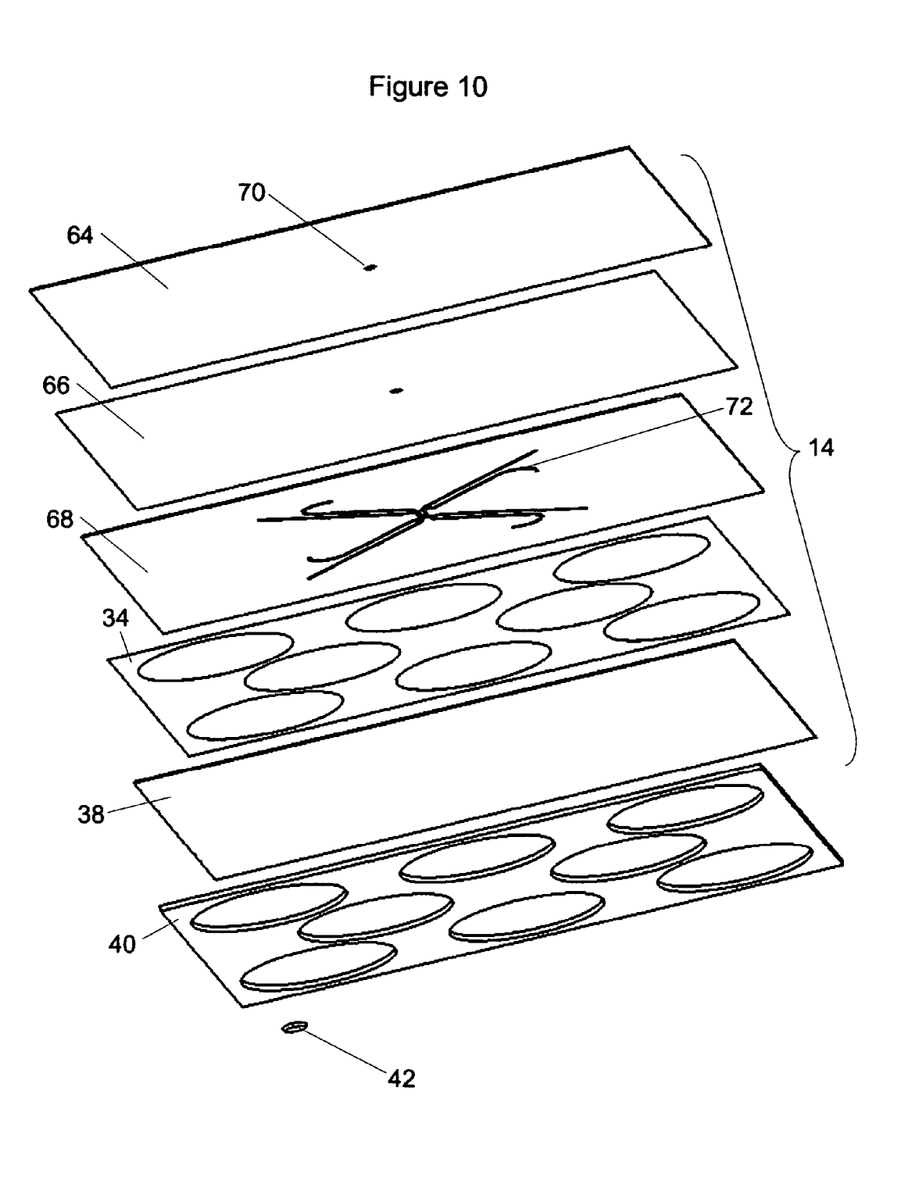
FIG. 10 shows an exploded view of the base.

FIG. 10 shows an exploded view of a laminated-style base that may be fabricated by forming apertures through relatively thin layers of material (i.e. sheet metal), bypassing the forming of blind grooved passages by routing as described in FIGS. 6 and 7. A thin backplate 64 with an air inlet hole 70 is attached to a manifold layer 68 by a contiguous bond layer 66. The manifold layer 68 contains openings 72 formed through the material as needed. The selective bond layer 34, membrane 38, stencil 40, and dimple 42 are attached in the previously described manner. Through-fasteners may optionally be used to secure the layers in addition to, or instead of, the bonding layers.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

The invention claimed is:

1. A fluid bearing base for facilitating movement of a heavy load such as a workbench, cabinet or equipment, comprising:
    a) a substantially planar backplate;
    b) a retractable, inflatable, substantially unitary membrane;
    c) means for coupling said base to a source of pressurized fluid to inflate said membrane; and
    d) a bonding layer comprising an adhesive film attached to said membrane and to said backplate at predetermined locations, providing for fluid passage therebetween.

2. The fluid bearing base in accordance with claim 1, further comprising a stencil and dimple assembly bearing against the side of said membrane remote from said backplate to form a plurality of fluid bearings.

3. The fluid bearing base in accordance with claim 1, wherein said means for coupling connects said base to a source of pressurized fluid comprising one of the group: a blower, compressor, and pump.

4. The fluid bearing base in accordance with claim 1, further comprising fluid distribution means operatively connected to said backplate and to each of said plurality of fluid bearings for providing pressurized fluid thereto.

5. The fluid bearing base in accordance with claim 4, wherein said fluid distribution means comprises a backplate manifold.

6. The fluid bearing base in accordance with claim 5, further comprising fluid flow control means operatively connected to said backplate manifold.

7. The fluid bearing base in accordance with claim 4, wherein said plurality of fluid bearings forms a grid thereof.

8. The fluid bearing base in accordance with claim 3, wherein said source of pressurized fluid is selected from the group: an on-board pressurized fluid tank, an on-board blower, an on-board compressor, an external compressor, an external pressurized fluid source, and an external pump.

9. The fluid bearing base in accordance with claim 1, wherein said fluid is selected from one of the group: gas, air, compressed air, water and oil.

10. The fluid bearing base in accordance with claim 1, further comprising:
   a) a component selected from the group: workbench, cabinet and equipment, said component being supported by and attached to said base.

* * * * *